G. B. SANFORD.
PICKING MECHANISM FOR LOOMS.

No. 173,740. Patented Feb. 22, 1876.

Witnesses.
S. N. Piper
[signature]

George B. Sanford,
by his attorney.
R. H. Eddy

UNITED STATES PATENT OFFICE.

GEORGE B. SANFORD, OF CAMBRIDGEPORT, VERMONT, ASSIGNOR TO HIMSELF AND MARY A. WELLINGTON, OF SAME PLACE.

IMPROVEMENT IN PICKING MECHANISMS FOR LOOMS.

Specification forming part of Letters Patent No. 173,740, dated February 22, 1876; application filed December 9, 1875.

*To all whom it may concern:*

Be it known that I, GEORGE B. SANFORD, of Cambridgeport, of the county of Windham and State of Vermont, have invented a new and useful Improvement in Mechanism for Operating the Picker of a Loom; and do hereby declare the same to be fully described in the following specification and represented in the accompanying drawings, of which—

Figure 1:
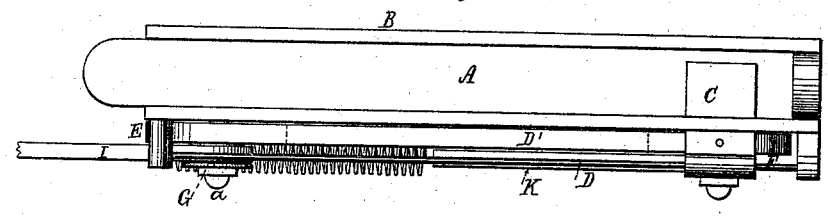
Figure 2:
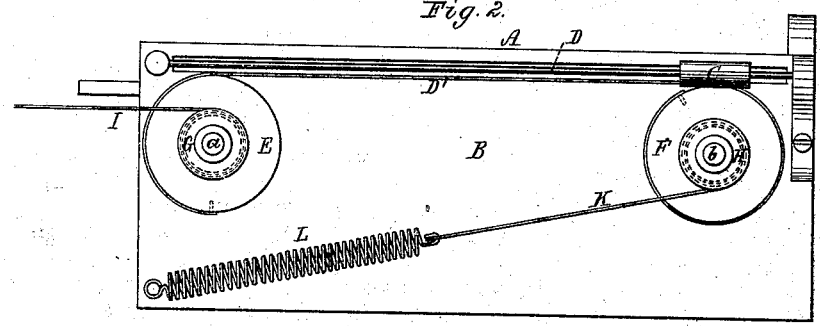

Figure 1 is a top view, and Fig. 2 a front elevation, of my invention applied to the lay and picker of a loom.

In such drawings, A denotes a shuttle-box, and B the race-beam part of a loom-lay directly under such, the same being provided with a picker, C, to run upon a rod, D, arranged in front of the box.

To the said picker there is fastened and projected in opposite directions a belt, D', which extends around, and is secured at its ends to, the peripheries of two wheels or pulleys, E F, arranged as shown, and on journals $a$ $b$, extending from the front side of the lay. There is fixed to each of said pulleys, concentrically, one of two other pulleys or wheels, G H.

A belt, I, is fastened at one end to and wound around the periphery of the pulley G. A similar belt, K, is secured at one end to and wound around the periphery of the pulley H, and is also joined at its other end to one end of a helical spring, L, arranged as shown, and fixed to the lay.

By means of a wheel or arm applied to the belt I, so as to draw it quickly lengthwise, the pulley G will be suddenly revolved, and will revolve the pulley E, thereby causing the belt D' to be wound upon it, and off the pulley F, so as to revolve the latter and advance the picker, and wind the belt K on the wheel H, against the tractile piece of the spring L.

On being relieved from the force by which the spring is expanded, such spring will contract and effect, by means of the belts D' K and wheels F H, the retraction of the picker.

My invention enables me to get rid of the common picker-staff, and its mechanism for causing its upper part to move in a straight line while throwing the picker, to cause it to advance a shuttle; and, besides, it effects the retreat of the picker independently of the shuttle. Furthermore, it is advantageous in other respects, comparatively.

I claim—

In a loom, the combination of the belts D' I K, wheels or pulleys E F G H, the spring L, and the picker and the lay, essentially as set forth.

GEORGE B. SANFORD.

Witnesses:
H. B. SAMPSON,
GEORGE F. WELLINGTON.